United States Patent
McCown et al.

(10) Patent No.: US 8,737,965 B2
(45) Date of Patent: May 27, 2014

(54) WIRELESS DEVICE MONITORING SYSTEMS AND MONITORING DEVICES, AND ASSOCIATED METHODS

(75) Inventors: Steven H. McCown, Rigby, ID (US); Kurt W. Derr, Idaho Falls, ID (US); Kenneth W. Rohde, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 360 days.

(21) Appl. No.: 12/188,284

(22) Filed: Aug. 8, 2008

(65) Prior Publication Data

US 2008/0291013 A1 Nov. 27, 2008

Related U.S. Application Data

(63) Continuation-in-part of application No. 11/745,319, filed on May 7, 2007.

(51) Int. Cl.
*H04M 1/66* (2006.01)

(52) U.S. Cl.
USPC ......... 455/411; 455/410; 455/456.4; 380/247

(58) Field of Classification Search
CPC ....... H04W 12/00; H04W 12/06; H04L 63/08
USPC ............ 455/411.1, 410, 456.4, 411; 380/287, 380/247
See application file for complete search history.

(56) References Cited

U.S. PATENT DOCUMENTS

| | | | |
|---|---|---|---|
| 6,377,810 B1 * | 4/2002 | Geiger et al. | 455/456.2 |
| 6,578,143 B1 * | 6/2003 | Rose | 713/164 |
| 6,779,115 B1 | 8/2004 | Naim | |
| 6,831,982 B1 | 12/2004 | Hughes et al. | |
| 7,024,395 B1 | 4/2006 | McCown et al. | |
| 7,206,569 B2 * | 4/2007 | Erskine et al. | 455/405 |
| 7,353,018 B2 * | 4/2008 | Mauney et al. | 455/421 |
| 7,400,891 B2 * | 7/2008 | Aaron | 455/456.4 |
| 2004/0031856 A1 | 2/2004 | Atsmon et al. | |
| 2004/0107219 A1 | 6/2004 | Rosenberger | |
| 2005/0038707 A1 | 2/2005 | Roever et al. | |
| 2005/0068169 A1 | 3/2005 | Copley et al. | |
| 2005/0120225 A1 | 6/2005 | Kirsch et al. | |
| 2005/0188194 A1 | 8/2005 | Fascenda | |
| 2005/0234860 A1 | 10/2005 | Roever et al. | |
| 2005/0250440 A1 | 11/2005 | Zhou et al. | |
| 2006/0135121 A1 | 6/2006 | Abedi et al. | |
| 2006/0165078 A1 | 7/2006 | Gopinath et al. | |
| 2006/0238610 A1 * | 10/2006 | Teesdale | 348/14.02 |

(Continued)

OTHER PUBLICATIONS

"Multi-Tasking Cell Phone Signal Detection System," www.antennasystems.com/cellphonedetector.html; copyright 2004-2006; printed Apr. 6, 2006, 3 pp.

(Continued)

*Primary Examiner* — Nghi H Ly (74) *Attorney, Agent, or Firm* — Ascenda Law Group, PC (57) ABSTRACT

Wireless device monitoring systems and monitoring devices include a communications module for receiving wireless communications of a wireless device. Processing circuitry is coupled with the communications module and configured to process the wireless communications to determine whether the wireless device is authorized or unauthorized to be present at the monitored area based on identification information of the wireless device. Methods of monitoring for the presence and identity of wireless devices are also provided.

30 Claims, 5 Drawing Sheets

(56) References Cited

U.S. PATENT DOCUMENTS

| | | | |
|---|---|---|---|
| 2007/0011729 | A1 | 1/2007 | White |
| 2007/0057038 | A1 | 3/2007 | Gannon |
| 2007/0087756 | A1 | 4/2007 | Hoffberg |
| 2007/0198432 | A1 | 8/2007 | Pitroda et al. |
| 2007/0226807 | A1 | 9/2007 | Ginter et al. |
| 2007/0241182 | A1 | 10/2007 | Buer |
| 2007/0250393 | A1 | 10/2007 | Alberth, Jr. et al. |
| 2007/0259658 | A1* | 11/2007 | Bihya .................. 455/422.1 |
| 2008/0010215 | A1 | 1/2008 | Rackley, III et al. |
| 2008/0025238 | A1 | 1/2008 | McCown et al. |
| 2008/0280592 | A1* | 11/2008 | McCown et al. ............. 455/411 |
| 2009/0141896 | A1 | 6/2009 | McCown et al. |
| 2009/0216680 | A1 | 8/2009 | McCown et al. |
| 2009/0216681 | A1 | 8/2009 | McCown et al. |

OTHER PUBLICATIONS

"FBI taps cell phone mic as eavesdropping tool," http://news.com.com/210-1029_3-61040191.html, Dec. 1, 2006, 4 pp.

International Search Report and Written Opinion, International Application No. PCT/US08/62675, International Filing Date May 5, 2008.

U.S. Appl. No. 11/460,662, Radio Frequency Detection Assembly and Method for Detecting Radio Frequencies, filed Jul. 28, 2006.

Bellare, Mihir, et al., "Keying Hash Funtions for Message Authentication", Jun. 1996, pp. 1-19.

Bellare, Mihir, et al., "Message Authentication using Hash Functions—The HMAC Construction", RSA Laboratories' CryptoBytes, 2(1):1-5, Spring 1996.

Borselius, N., "Multi-agent system security for mobile communication", Technical Report, Royal Holloway University of London, Sep. 1, 2003.

Heydt-Benjamin, Thomas S. et al., "RFID Payment Card Vulnerabilities Technical Report", Oct. 11, 2006, pp. 1-6.

Heydt-Benjamin, Thomas S. et al., "Vulnerabilities in First-Generation RFID-enabled Credit Cards", Oct. 22, 2006, pp. 1-17.

Koolspan, "KoolSpan OEM solutions" KoolSpan TrustChip Family website located at: HTTP://wwww.koolspan.com/oem, printed on Oct. 15, 2007.

Koolspan, "KoolSpan TrustChip Solutions for OEMs" website located at: HTTP://wwww.koolspan.com/oem/trust_chiphardware.htm, printed on Oct. 15, 2007.

Koolspan, "White Paper: An innovative integration of advanced crypto hardware and software, enabling simple secure network connectivity for enterprise and industrial applications", KoolSpan Foundation Technology, no date.

PCT, International Search Report and Written Opinion, PCT/IB08/03377 (International filing date Dec. 8, 2008), mailed Jul. 13, 2009.

PCT, International Search Report and Written Opinion, PCT/US09/32273 (International filing date Jan. 28, 2009), mailed Mar. 13, 2009.

PCT, International Search Report and Written Opinion, PCT/US09/32279 (International filing date Jan. 28, 2009), mailed Mar. 16, 2009.

"RFID Reference Model", CE RFID, Version 2007 2-1, Jan. 10, 2007.

"The Keyed-Hashed Message Authentication Code (HMAC)", FIPS PUB 198, Mar. 6, 2002.

Wong, Ford-Long et al., "Repairing the Bluetooth pairing protocol", Security Protocols 2005, pp. 1-17.

PCT, International Search Report and Written Opinion, PCT/US09/35205 (International filing date Feb. 26, 2009), mailed Nov. 6, 2009.

* cited by examiner

WIRELESS DEVICE MONITORING SYSTEMS AND MONITORING DEVICES, AND ASSOCIATED METHODS

CROSS-REFERENCE TO RELATED APPLICATION

This application is a continuation-in-part from a U.S. patent application Ser. No. 11/745,319, filed May 7, 2007, the disclosure of which is incorporated herein in its entirety by this reference.

GOVERNMENT RIGHTS STATEMENT

The United States Government has certain rights in this invention pursuant to Contract No. DE-AC07-051D 14517 between the United States Department of Energy and Battelle Energy Alliance, LLC.

TECHNICAL FIELD

The present invention relates to monitoring devices and methods. More particularly, embodiments of the present invention relate to monitoring devices and systems for detecting the presence and identity of wireless communication devices, as well as to associated methods.

BACKGROUND

Wireless devices and personal electronic devices (PEDs) such as cell phones, Blackberries, two-way pagers, wireless headsets, keyboards, etc., have become an integral part of today's lifestyle. This is especially true in the business world where voice communication, e-mail, instant messaging, electronic calendars, etc., have become a standard way of conducting business operations.

Although wireless devices are important tools for modern businesses and organizations, such wireless devices also introduce potential security threats. For example, it has been recognized that wireless devices can be used as tracking devices (via integrated GPS chips), staging areas for Denial of Service (DoS) and other attacks, as well as "roving bugs" wherein attackers remotely turn on device microphones to eavesdrop. Accordingly, concerns have been raised regarding use of wireless devices for espionage. For example, in a corporate environment, when corporate executives or other corporate members meet to discuss internal strategies and operations, they wish to do so without the fear of inadvertently divulging their entire meeting to competing corporations. One possible reaction to alleviate the threat created by introducing wireless devices into proprietary meetings is to completely ban such wireless devices from meeting rooms and other sensitive areas of corporate or government activity. This solution is unacceptable in many situations as meeting participants often need to be reachable, even when they are in meetings, as evidenced by the growing proliferation of Research in Motion's BLACKBERRY® devices, as well as other similar devices.

BRIEF SUMMARY

Various embodiments of the present invention comprise monitoring devices for detecting the presence and identity of wireless devices in a specified area or location and for providing a warning or some other indication when an unauthorized wireless device is detected. In one or more embodiments, the monitoring device may comprise a communications module and processing circuitry coupled to the communications module. The communications module may be configured to receive wireless communications of a wireless device within a monitored area. The processing circuitry may be configured to process the wireless communications of the wireless device to determine whether the wireless device is authorized or unauthorized to be present at the monitored area based on identification information of the wireless device.

Other embodiments of the present invention comprise monitoring systems for monitoring for the presence and identity of wireless devices in a specified area. One or more embodiments of such systems may include at least one monitoring device including a communications module and processing circuitry coupled to the communications module.

Still other embodiments comprise methods for monitoring wireless devices entering or within a specified area or location. One or more embodiments of such methods may include detecting a wireless device within a monitored area. Identification information may be obtained regarding the wireless device. For example, the wireless device may be interrogated and at least one reply may be received from the wireless device responsive to the interrogations. Based on the obtained identification information, the wireless device may be determined as authorized or unauthorized to be present at the selected area.

DETAILED DESCRIPTION

In the following detailed description, circuits and functions may be shown in block diagram form in order not to obscure the present invention in unnecessary detail. Additionally, block definitions and partitioning of logic between various blocks as depicted is non-limiting, and comprise examples of only specific embodiments. It will be readily apparent to one of ordinary skill in the art that the present invention may be practiced in a variety of embodiments implementing numerous other partitioning solutions.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process is terminated when its acts are completed. A process may correspond to a method, a function, a procedure, a subroutine, a subprogram, etc. Furthermore, the methods disclosed herein may be implemented in hardware, software, or both.

Figure 1:
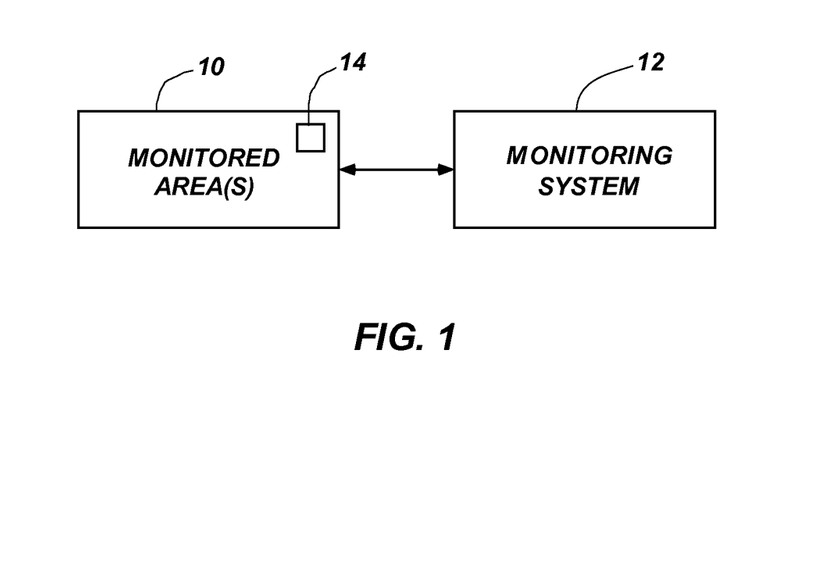
FIG. 1 is a block diagram illustrating one or more monitored area(s) with an associated wireless device monitoring system.

Various embodiments of the present invention are directed toward embodiments of a wireless device monitoring system for detecting the presence and identity of wireless devices in a specified area or location and for providing a warning or some other indication when an unauthorized wireless device is detected. FIG. 1 illustrates one embodiment of a wireless device monitoring system 12 associated with one or more monitored area(s) 10 to monitor for the presence of wireless devices 14. Monitored areas 10, which may also be referred to as secure areas, may comprise any areas wherein it may be desired or important to obtain information regarding all present wireless devices 14 and their use. By way of example and not limitation, monitored areas 10 may include conference rooms, offices or manufacturing floors (e.g., of a corporation, government entity or other organization) in which sensitive material may be discussed and/or shown. By way of further example and not limitation, wireless devices 14 may include personal electronic devices (PEDs) such as cell phones, pagers, personal music players having wireless communication capabilities (e.g., iPODS®), smart phones (e.g., BLACKBERRIES®), computers, wireless headsets, keyboards, or any other device comprising or configured with wireless communication capabilities.

In some embodiments, one or more monitoring device(s) (discussed below) of monitoring system 12 may be positioned adjacent to respective point(s) of ingress and egress of monitored areas 10 to provide wireless device monitoring functions. In other embodiments, a single monitoring device with extended range may be configured to monitor a plurality of points of ingress and egress as well as other floor space or areas of one or more respective monitored area(s) 10. Other embodiments and/or applications of use are also possible.

Monitoring system 12 may be implemented in different configurations according to respective different applications and configurations of monitored areas 10 to be monitored. For example, for applications where a single monitored area 10 is to be monitored, monitoring system 12 may include a single monitoring device (e.g., a node device 16 (FIG. 3)) configured to provide wireless device monitoring and analysis functions with respect to the single monitored area 10. For additional applications, including applications in which a plurality of monitored areas 10 are to be monitored, monitoring system 12 may include one or more monitoring devices which communicate with a centralized monitoring device (e.g., a management device 30 (FIG. 4)). The centralized monitoring device may provide analysis of the information provided by the plurality of monitoring devices. In another embodiment, the centralized monitoring device may communicate with devices external of the monitoring system 12 (for example external devices associated with another corporation or other organization) and which implement one or more analysis aspects of the disclosure. Details of these embodiments are described below and monitoring system 12 may be implemented differently in other embodiments apart from the examples described herein.

Figure 2:
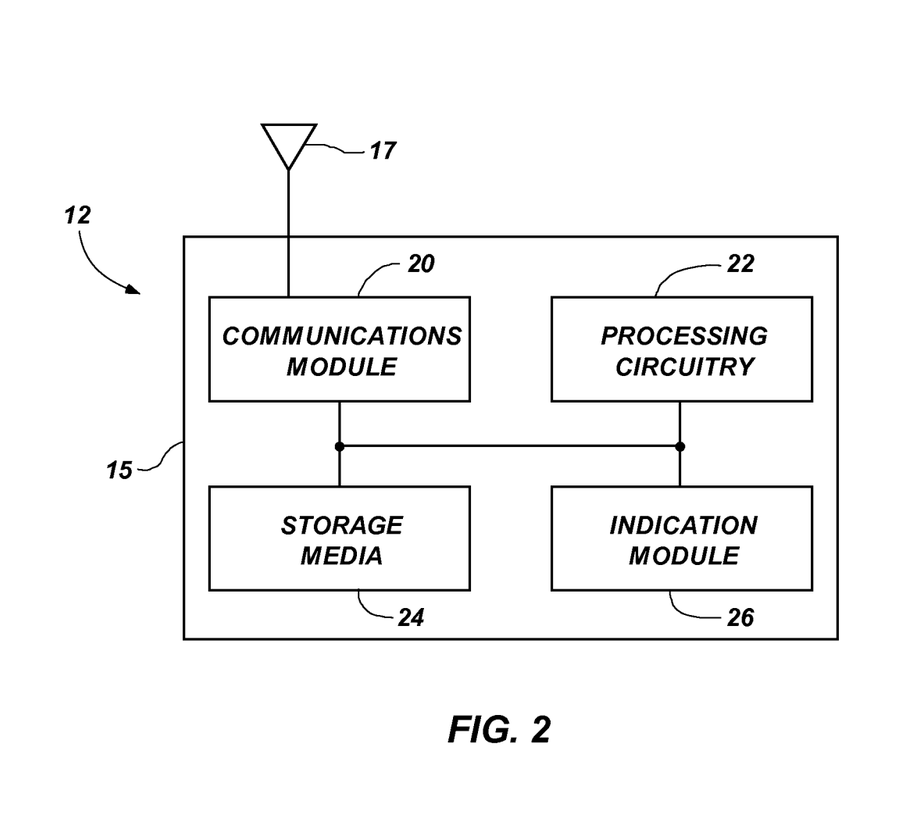
FIG. 2 illustrates a block diagram of a configuration for a monitoring device of the wireless device monitoring system, according to one embodiment.

FIG. 2 illustrates a configuration for a monitoring device 15 of the monitoring system 12, according to one embodiment. As illustrated, a monitoring device 15 may include a communications module 20 which may also be referred to as communications circuitry, processing circuitry 22, storage media 24 which may also be referred to as storage circuitry, and an indication module 26 which may also be referred to as indication circuitry. Other arrangements within the scope of the invention are contemplated, including more, fewer and/or alternative components.

The communications module 20 is configured to implement wireless and/or wired communications of monitoring device 15. For example, in some embodiments, communications module 20 may be configured to communicate information bi-directionally with respect to wireless devices 14 as well as other devices of monitoring system 12. The communications module 20 may be coupled with an antenna 17 and may include wireless transceiver circuitry for wireless communications with wireless devices 14 and may also include as a network interface card (NIC), serial or parallel connection, USB port, Firewire interface, flash memory interface, floppy disk drive, or any other suitable arrangement for communicating with respect to public (e.g., Internet) and/or private networks or other wired arrangements.

Figure 5:
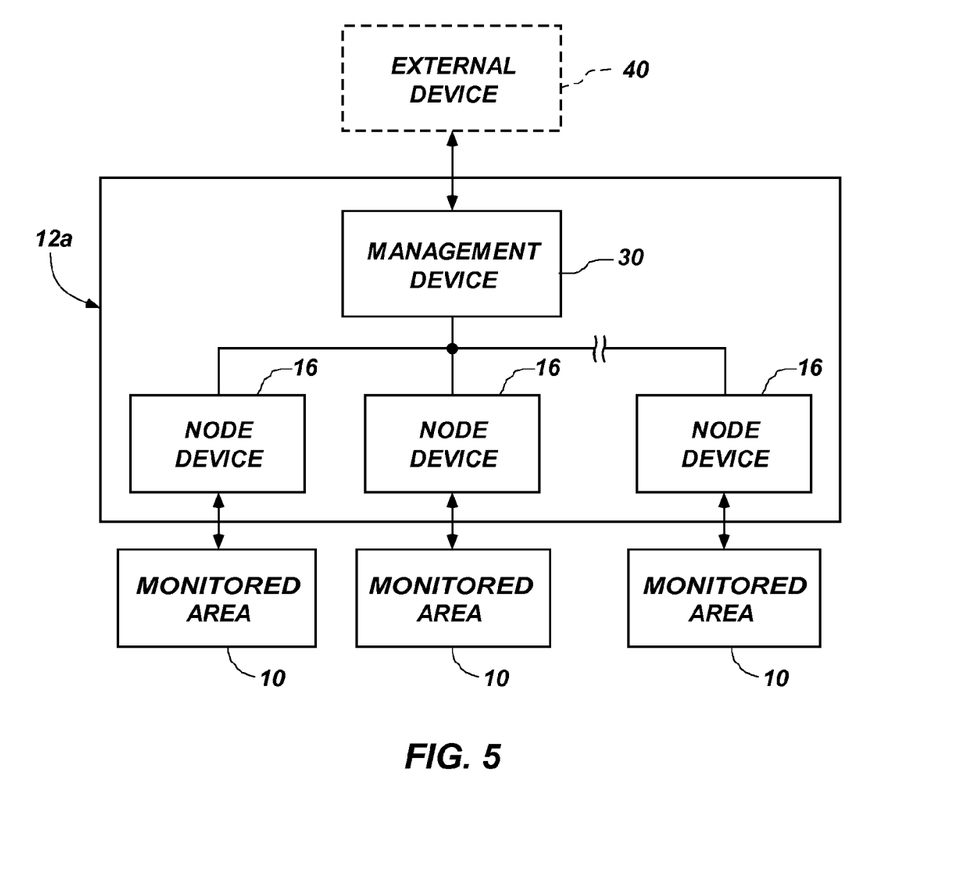
FIG. 5 is a block diagram illustrating an arrangement of a monitoring system configured to monitor a plurality of monitored areas according to one embodiment.
Figure 6:
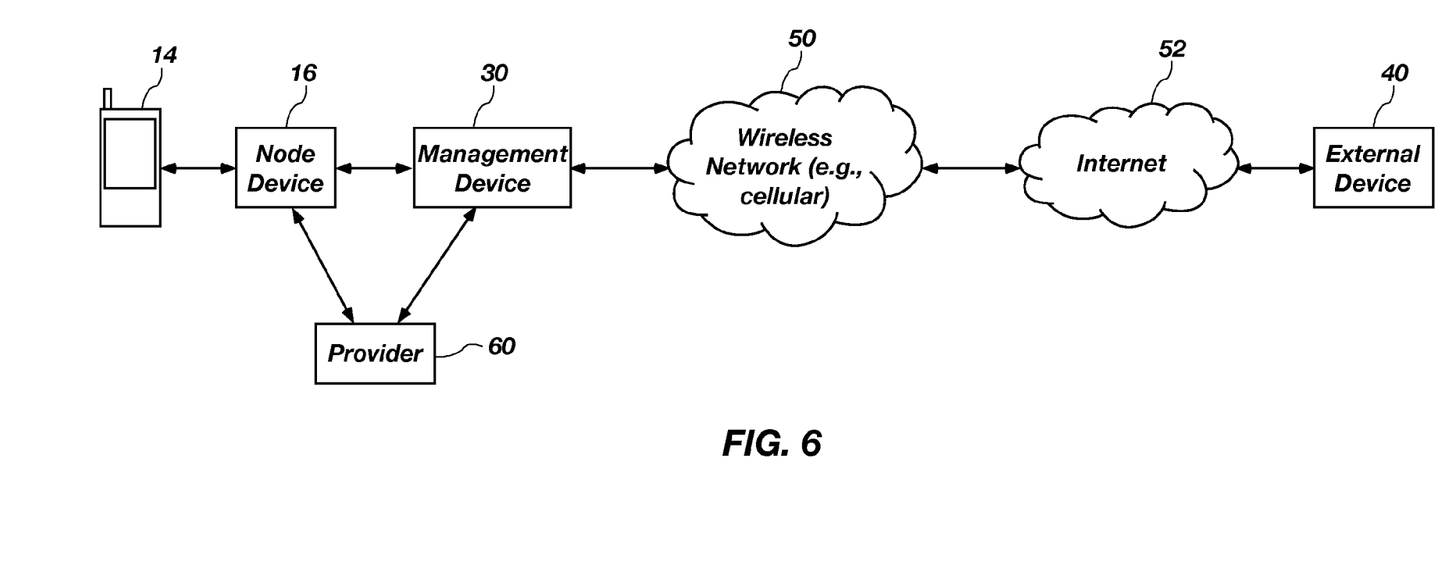
FIG. 6 is a flow diagram illustrating verification operation and components according to one embodiment.

In some embodiments, the communications module 20 may be configured to detect wireless communications of wireless devices 14, send and/or receive wireless communications of the wireless devices 14 within a monitored area 10, send and/or receive communications to/from one or more other monitoring devices of monitoring system 12 as well as external devices, and/or communicate with one or more telecommunications provider(s) 60 (FIG. 6). By way of example and not limitation, the communications module 20 may include an RF detection module configured for detecting RF signals from wireless devices 14 within a monitored area 10. The communications module 20 may also include an RF interrogation module configured to communicate with wireless devices 14 by outputting wireless communications to wireless devices 14 and receiving responsive wireless communications from wireless devices 14. Furthermore, a system communication module 36 or a node device communication module 46 may be included and configured to communicate with other devices of monitoring system 12 and an external device communication module 48 may be configured to communicate with external devices 40 (FIG. 5). Finally, the communications module 20 may include a telecommunications (Telco) communication module 38 for communicating with one or more telecommunications provider(s) 60.

In one embodiment, the Telco communication module 38 may be configured to implement communications with the telecommunications provider 60. The communications module 20 may be configured to communicate with the telecommunications provider 60 using any suitable communications. For example, the communications module 20 may communicate with the telecommunications provider 60 using a network of the telecommunications provider 60. In another embodiment, the communications module 20 may communicate with the telecommunications provider 60 over a packet switched network, land line or other suitable communications channel. In one embodiment, the communications module 20 may operate as a femto cell to receive the wireless communications signals from the wireless device 14 and to forward the communications received from the wireless device 14 to the telecommunications provider 60 using a broadband connection over the Internet.

In one embodiment, processing circuitry 22 is arranged to obtain, process and/or send data, control data access and storage, issue commands, and control other desired operations. Processing circuitry 22 may comprise circuitry configured to implement desired programming provided by appropriate media in at least one embodiment. For example, the processing circuitry 22 may be implemented as one or more of a processor, a controller, a plurality of processors and/or other structure configured to execute executable instructions including, for example, software and/or firmware instructions, and/or hardware circuitry. Embodiments of processing circuitry 22 include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. These examples of processing circuitry 22 are for illustration and other suitable configurations within the scope of the invention are also contemplated.

The storage media 24 is configured to store programming such as executable code or instructions (e.g., software and/or firmware), electronic data, databases, or other digital information and may include processor-usable media. A non-limiting example of a database may include information regarding a plurality of wireless devices 14 which may be present in one or more monitored areas 10. A storage medium may be any available media that can be accessed by a general purpose or special purpose computer. By way of example and not limitation, a storage medium may comprise one or more devices for storing data, including read-only memory (ROM), random access memory (RAM), magnetic disk storage mediums, optical storage mediums, flash memory devices, and/or other computer-readable mediums for storing information.

Processor-usable media may be embodied in any computer program product(s) or article of manufacture(s) which can contain, store, or maintain programming, data and/or digital information for use by or in connection with an instruction execution system including processing circuitry in the exemplary embodiment. For example, suitable processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments described herein may be implemented using programming stored within appropriate storage media described above and/or communicated via a network or other transmission media and configured to control appropriate processing circuitry. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Programming including processor-usable code may be communicated as a data signal embodied in a carrier wave, in but one example.

Indication module 26 is configured to generate an indication regarding the presence and identity of wireless devices 14 at the monitored areas 10. In one embodiment, indication module 26 generates a human perceptible indication, such as a silent alarm, a visual alarm and/or an audible alarm, at one or more locations to indicate the presence and identity of one or more wireless devices 14. Indication module 26 may include a display to convey information regarding wireless devices 14 to an operator. Indications may be used to indicate a presence of authorized and/or unauthorized wireless devices 14 at monitored areas 10.

Figure 3:
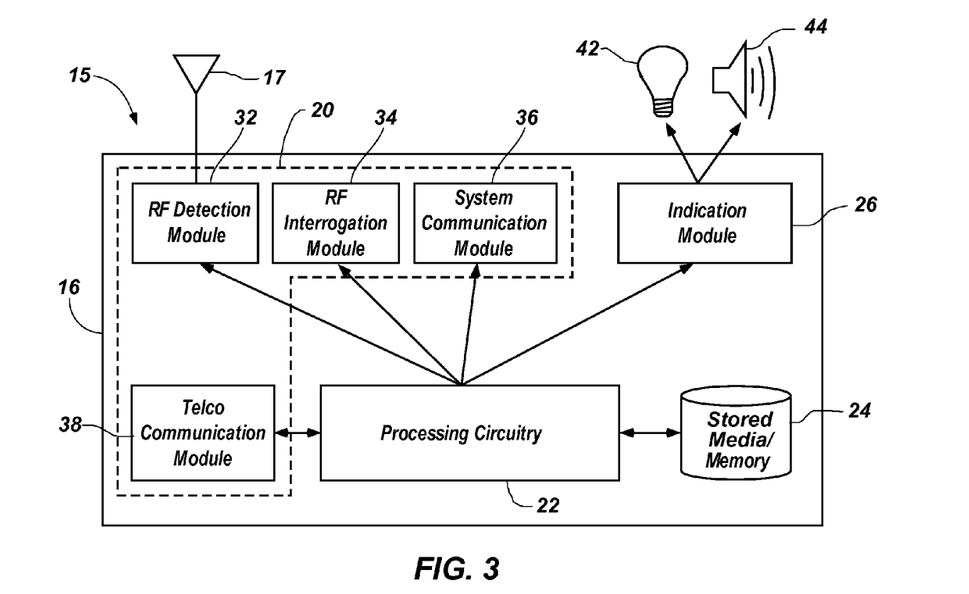
FIG. 3 illustrates an example of a monitoring device configured according to one embodiment of a node device.

As described above, monitoring device 15 may be configured in a variety of ways according to the specific application. FIG. 3 illustrates a monitoring device 15 configured according to one embodiment of a node device 16. In this embodiment, the node device 16 comprises a communications module 20 configured to receive wireless communications of a wireless device 14 within a monitored area 10. The communications module 20 is coupled to processing circuitry 22 which may be configured to process the wireless communications to determine whether the wireless device is authorized or unauthorized.

The communications module 20 in some embodiments includes an RF detection module 32, an RF interrogation module 34, a system communication module 36 and a Telco communication module 38. The RF detection module 32 may be configured for detecting wireless communications of one or more wireless devices 14. The RF interrogation module 34 may be configured to output wireless communications (e.g., an interrogation signal) and receive responsive wireless communications (e.g., a response signal) from the wireless devices 14, the processing circuitry 22 being configured to determine whether the wireless devices 14 are authorized or unauthorized using the replies. The system communication module 36 may be configured for communicating wireless communications, as well as other information, with at least one other monitoring device 14 of system 12 which may be configured to determine whether the wireless devices 14 are authorized or unauthorized. Furthermore, the system communication module 36 in some embodiments may be configured to communicate with one or more external devices 40. The Telco communication module 38 may be configured for communicating with one or more telecommunications providers, including forwarding the wireless communications to the one or more telecommunications providers. If the wireless communications of the wireless devices 14 are encrypted, the Telco communication module 38 may also be configured for receiving communications from the telecommunications provider including at least a portion of the wireless communications in an unencrypted format.

The node device 16 may further comprise one or more storage media 24 configured to store information regarding one or more authorized wireless devices 14. The storage media 24 may comprise memory to which, inter alia, a data base of subscriber data or other data is stored. The one or more storage media 24 is coupled to the processing circuitry 22 such that the processing circuitry 22 may use the stored information to determine whether the wireless device 14 is authorized or unauthorized to be present at the monitored area 10. An indication module 26 may also be included, the indication module 26 being configured to generate an indication regarding the presence of the wireless devices 14. The indication module 26 may be operably coupled to at least one of a visual indicator 42 (e.g., a light) and an audio transducer 44 (e.g., a speaker).

Figure 4:
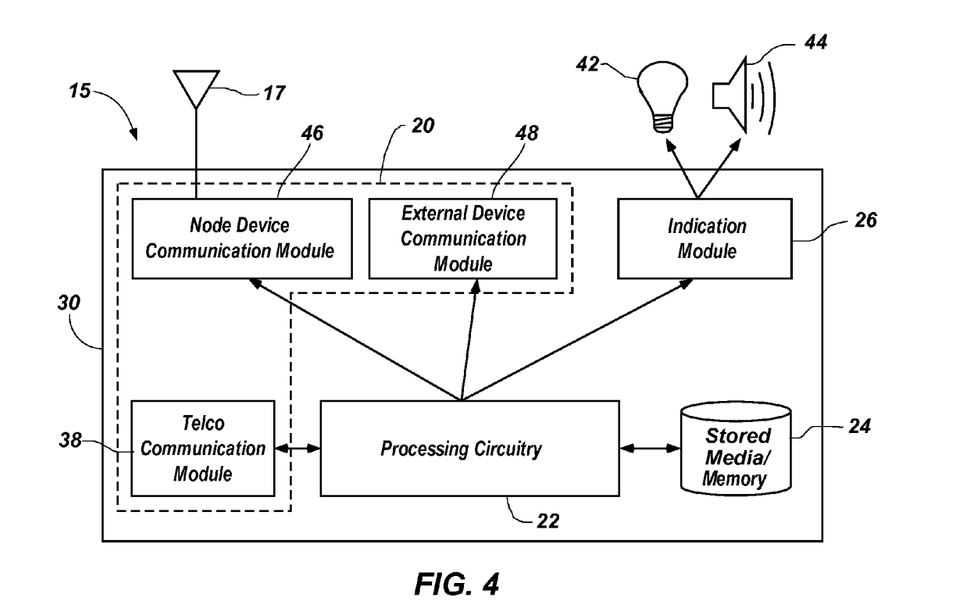
FIG. 4 illustrates an example of a monitoring device configured according to one embodiment of a management device.

FIG. 4 illustrates a monitoring device 15 configured according to one embodiment of a management device 30.

The management device 30 comprises each of the components described above with regard to FIG. 2. The communications module 20 of the management device 30 is configured to receive wireless communications of a wireless device 14 within a monitored area 10. In this embodiment, the communications module 20 receives the wireless communications from at least one other monitoring device 15, such as a node device 16. The communications module 20 may include a node device communication module 46 for communicating with the at least one other monitoring device 15. The communications module 20 is coupled to processing circuitry 22 which may be configured to process the wireless communications to determine whether the wireless device 14 is authorized or unauthorized. The communications module 20 also includes an external device communication module 48 to communicate with at least one external device 40, Furthermore, the communications module 20 includes a Telco communication module 38 for communicating with one or more telecommunications providers. The Telco communication module 38 may forward the wireless communications of the wireless devices 14 to a telecommunications provider and, if the wireless communications from the wireless device 14 are encrypted, the Telco communication module 38 may also receive communications from the telecommunications provider including at least a portion of the wireless communications in an unencrypted format.

The management device 30 may comprise one or more storage media 24 configured to store information regarding one or more authorized wireless devices 14. The storage media 24 may comprise memory to which, inter alia, a data base of subscriber data or other data is stored. The one or more storage media 24 is coupled to the processing circuitry 22 such that the processing circuitry 22 may use the stored information to determine whether the wireless device 14 is authorized or not. An indication module 26 may also be included and configured to generate an indication regarding the presence of the wireless devices 14. The indication module 26 may be operably coupled to at least one of a visual indicator 42 (e.g., a light) and an audio transducer 44 (e.g., a speaker).

Referring to FIG. 5, an arrangement of monitoring system 12a configured to monitor a plurality of monitored areas 10 is shown according to one embodiment. The arrangement of monitoring system 12a includes a plurality of node devices 16 associated with and configured to monitor a plurality of respective monitored areas 10. The node devices 16 are configured to communicate with a management device 30, which, in some embodiments, may be implemented as a server. In some embodiments, the node devices 16 and the management device 30 may be individually configured according to the node device 16 illustrated in FIG. 3 and the management device 30 illustrated in FIG. 4, respectively.

As illustrated in FIG. 5 and described in further detail below, in some embodiments the node devices 16 may communicate with the wireless devices 14 and output communications to management device 30 for analysis. In one embodiment (e.g., single organization application), the management device 30 performs the analysis. In another embodiment (e.g., multiple organization application), the management device 30 may communicate with an external device 40 which performs the analysis. In some arrangements, the monitoring system 12a is implemented within one organization or entity (e.g., corporation) and the external device 40 is associated with a different organization or entity. Other embodiments are possible.

Referring to FIG. 6, monitoring monitored areas for the presence of wireless devices 14 is shown and described according to one embodiment. Initially, a node device 16 is configured to monitor for the presence of a wireless device 14 at a respective monitored area 10, for example, adjacent to a point of ingress of the monitored area 10. As described above, the node device 16 may include a RF detection module 32 configured to detect wireless communications from wireless devices 14. In one embodiment, node device 16 is configured to scan frequencies of use of wireless devices 14 and may detect wireless devices 14 by RF signals emitted therefrom (for example when the wireless device 14 is communicating with other devices or servers) and received by communications module 20 (FIG. 2). Additional details of detection of wireless devices 14 according to one embodiment are described in a co-pending U.S. patent application Ser. No. 11/460,662, filed Jul. 28, 2006 entitled "Radio Frequency Detection Assembly and Method for Detecting Radio Frequencies," the disclosure of which is incorporated herein in its entirety by reference.

Following the detection of a wireless device 14, node device 16 may generate a communication to interrogate the wireless device. The communication to the wireless device 14 may include an identifier (e.g., authentication ID) to the wireless device 14 which identifies the node device 16. The communication may request identification information of the wireless device 14. The communication may include one or more challenges, such as "What is your unique device identifier (ID)?," "Are you enrolled in a corporate PED server?" and "Who is your corporate PED server?" In one embodiment, the communication may include a request for device authentication data, such as configuration information from the wireless device 14 which corresponds to a present configuration (e.g., all system files and settings) of the wireless device 14.

In some embodiments, the wireless devices 14 may be individually configured to implement operations in conjunction with the communication from the node device 16. For example, wireless device 14 may include previously loaded authentication software which configures the wireless device 14 to receive and process the communication from the node device 16, gather the appropriate information, and return appropriate replies to the node device 16. The authentication software may include embedded digital signatures and/or encryption keys to perform signing and/or encryption functions. In response to the communication from the node device 16, the wireless device 14 may formulate a reply communication such as a digitally signed response. The response may include a device identifier, an identifier of the corporate PED server associated with the wireless device 14, the device authentication data and/or additional information. The device authentication data may include configuration information in the form of an encrypted digital hash. In one embodiment, an encrypted digital hash is determined by a wireless device 14 upon itself. For example, the wireless device 14 may use a signing key specified by the corporate PED server to compute a digital hash of its configuration information (e.g., internal operating system files/data, user and/or CPS installed applications/data, etc).

In some embodiments, node device 16 may communicate session tokens to the wireless devices 14 upon detection of the wireless devices 14. Plural session tokens may be generated as unique identifiers for respective interrogation sessions of detected wireless devices 14. Wireless devices 14 may include the respective session tokens in the computations of the digitally signed responses. The session tokens may be used to ensure that previous digitally signed responses of wireless devices 14 are not archived for future use and may preclude spyware or malware from masquerading as legitimate wireless devices 14. When authenticating wireless devices 14, node device 16 may take into account previously stored responses from respective wireless devices 14 and respective session tokens when analyzing current responses of wireless devices 14.

Furthermore, according to some embodiments, an insertion point may be communicated from node device 16 to wireless device 14 instructing wireless device 14 of where to insert the session token into the hashing function (e.g., after the $5^{th}$ file, after the $25^{th}$ file, etc.). Specifying the location of the session token at a certain index according to one embodiment may help preclude overload attacks against digital signature algorithms. Node device 16 may archive digital hashes of individual files or setting groups as opposed to a single hash of all information in one embodiment. Archiving may be implemented when wireless devices 14 are registered into service and at known system update times in some examples.

In another embodiment, node device 16 may initiate a communication to wireless device 14 which includes a Node Identification Value (NIV) upon detection of the presence of wireless device 14. In one embodiment, the NIV may reference the communicating node device 16 without identifying it directly. For example, a hash may be taken of an actual node ID of the node device 16 and combined with a timestamp of the request to form the NIV. The wireless device 14 may decode the NIV and determine whether it is desired to reply or not (an alarm may be issued if device 14 does not reply). Some wireless devices 14 in this described embodiment may be programmed to not divulge device identifiers, affiliations with a company or a service, etc.

In particular, company policy, or other policy, may determine whether wireless device 14 responds to some, all, or none of the received node interrogation requests and may be configurable by the owner of wireless device 14, a node administrator, or both. This capability to reply or not according to one embodiment may reduce vulnerability of wireless devices 14 to undesired tracking compared with tag devices such as RFID or Bluetooth.

The wireless devices 14 may provide one or more communications in response to the communications or interrogation from the node device 16. As mentioned above, the response may include the device ID, as well as device authentication data. The monitoring system may then determine whether the wireless devices 14 is authorized or unauthorized to be present at the monitored area 10. In some embodiments in which just a single node device 16 is employed, the node device 16 may be configured to perform the operations of the management device 30 and the external device 40 of FIG. 6, as described in more detail below. In such an embodiment, no management device 30 or external device 40 is employed. In addition, the operations of external device 40 may be implemented within management device 30 in embodiments wherein monitoring and analysis is performed within a single organization or system. Therefore, depending upon the embodiment, node device 16 may itself analyze the information of the responsive communications to determine whether wireless devices 14 are authorized or unauthorized, or the node device 16 may communicate the responsive communications to a remote device (e.g., management device 30 or external device 40 (if present)) for analysis.

The received device ID and device authentication data may be analyzed by the node device 16, management device 30 and/or the external device 40 (depending upon the embodiment of the monitoring system 12) to determine whether an alarm or other indication is to be generated. In one embodiment, the appropriate node device 16, management device 30 or external device 40 may include a database including a list of wireless devices 14 authorized to be present in a respective monitored area 10. An alarm may be generated if the wireless device 14 is not recognized as an authorized device. The alarm or other indication may be generated by node device 16, management device 30, external device 40 and/or other modules or circuitry.

In some embodiments, the device authentication data comprising configuration information of wireless device 14 is analyzed to determine if any unauthorized changes have been made to the configuration of an otherwise authorized wireless device 14. For example, the appropriate device 16, 30, 40 may use the device ID of the wireless device 14 to access stored configuration information of the respective wireless device 14 from a database. The stored configuration information may comprise information regarding a configuration of the wireless device 14 at an initial moment in time (e.g., a hash of the configuration information at a time of issuance of wireless device 14 to an employee). In one embodiment, monitoring system 12 performs operations at subsequent moments in time (e.g., when wireless device 14 is detected at a location of a monitored area 10) to verify that the configuration of the wireless device 14 has not been modified since the initial moment in time.

If the configuration of the wireless device 14 has been changed, one or more of the devices 16, 30, 40 may issue an alarm or other indication. The stored configuration information may be in the form of a hash and the respective device 16, 30, 40 performing the device configuration analysis may compare the stored hash with the hash provided by the wireless device 14 to determine whether the configuration has been changed. If the respective device 16, 30, 40 determines that the configuration has been changed, the respective device 16, 30, 40 may issue an appropriate alarm or indication. For example, if an operating system file, a file installed by the corporate PED server, or a controlled setting has been modified or if an application has been installed, the hash of the received device configuration information will compute differently than the stored hash indicating that the wireless device 14 may have been modified by a malicious attacker or otherwise compromised.

In some employment scenarios, some wireless devices 14 may implement wireless communications where some of the information being communicated is not encrypted and can be received and directly read by monitoring system 12 in determining whether the wireless device 14 is authorized to be present at the location being monitored. For example, at least some of the content of GSM wireless communications is not encrypted and may be readily received and read by the monitoring system 12. In other wireless devices, some or all of the information being communicated via wireless communications may be indecipherable by the monitoring system 12. For example, the data content, header and/or other information (e.g., device ID, configuration information of the wireless device 14) of the wireless communications may be encrypted or otherwise not readable or accessible by the monitoring system 12. By way of example, UMTS and WCDMA utilize encryption where call details such as identification information of a communicating device may be indecipherable to monitoring system 12. At least some of the below-described embodiments permit authentication operations described herein to be performed even though wireless communications of the wireless device 14 received by monitoring system 12 may be encrypted or otherwise indecipherable to monitoring system 12.

In some geographical locations, breaking the encryption and decoding the information being communicated via wireless communications may be considered wiretapping and, thus, may be against the law. In some embodiments, node device 16 and/or management device 30 (depending on the configuration of monitoring system 12) may be configured to implement communications with an external device, such as a communications device of a telecommunications provider or carrier 60 in an attempt to decipher encrypted identification information from wireless device 14. Such a configuration may avoid the legal entanglements of potential wire tapping. In one embodiment, telecommunications provider 60 may be a wireless communications provider, such as a cellular telecommunications provider configured to implement cellular communications between plural devices including wireless device 14 using a wireless network of the telecommunications provider 60.

If the identity of wireless device 14 cannot be directly determined by the monitoring system 12 from the received wireless communications because the received wireless communications are indecipherable (e.g., header information of the wireless communications is encrypted), the monitoring system 12 may be configured to implement communications with telecommunications provider 60 to determine the identity of the wireless device 14. In some embodiments, the monitoring system 12 is configured to forward indecipherable wireless communications which were received by monitoring system 12 to telecommunications provider 60 for authentication and to determine the identity of the wireless device 14. In one embodiment, monitoring system 12 may be configured to decode part of the wireless communications received from wireless device 14 identifying the appropriate telecommunications provider 60 to which the wireless communications are to be forwarded to even though other portions of the wireless communications are indecipherable to the monitoring system 12 (e.g., identification information of the wireless device 14). The wireless communications forwarded to the telecommunications provider 60 may or may not be modified by the monitoring system 12.

The telecommunications provider 60 may be configured to decode and process (e.g., decrypt) received wireless communications and to provide reply information, including at least a portion of the indecipherable communications, which may include identification information, to the monitoring system 12 in a decipherable format. The monitoring system 12 may then uniquely identify the wireless device 14. In some embodiments, monitoring system 12 may not include a management device 30 and node device 16 is configured to communicate with the telecommunications provider 60. In embodiments where management device 30 is present within monitoring system 12, a node device 16 may forward wireless communications received by the node device 16 to management device 30 and management device 30 may be configured to forward the wireless communications to the telecommunications provider 60. In other embodiments, the node device 16 may be configured to forward wireless communications to the telecommunications provider 60 and to forward any reply information from the telecommunications provider 60 to the management device 30. In still other embodiments, the node device 16 may forward wireless communications to the telecommunications provider 60, and the telecommunications provider 60 may then communicate reply information to the management device 30.

In one embodiment, the communications module 20 (FIG. 2) of the node device 16 (or management device 30) is configured to implement communications with telecommunications provider 60 to determine the identity of the wireless device 14. For example, the node device 16 (or management device 30) may be configured as described with reference to FIGS. 3 and 4 above, in which the communications module 20 includes a Telco communication module 38. In one possible configuration, the communications module 20 may receive the wireless communications from the wireless device 14 and forward the received wireless communications to an appropriate communications device of the telecommunications provider 60 which is configured to receive the communications. In some example embodiments, the operator of monitoring system 12 is a different entity than the telecommunications provider 60 and an arrangement exists where the monitoring system 12 is to forward indecipherable wireless communications to the telecommunications provider 60 in an attempt to learn the identity of the wireless device 14. In other embodiments, the monitoring system 12 may be a part of the telecommunications provider 60 and the telecommunications provider 60 may have a dedicated department to service inquiries from the monitoring system 12. Other arrangements are also contemplated within the scope of the invention.

In one embodiment, the wireless communications from the wireless device 14 detected by the monitoring system 12 and the communications of the monitoring system 12 with the telecommunications provider 60 occur over respective independent communications links (e.g., the wireless communications may comprise RF signals received by the monitoring system 12 and the communications of the monitoring system 12 and the telecommunications provider 60 may occur over the Internet in one embodiment). Other embodiments and configurations for communicating with the telecommunications provider 60, including forwarding the received communications to the telecommunications provider 60, are also possible.

Telecommunications provider 60 is authorized and capable of deciphering the wireless communications emitted from the wireless device 14, received by the monitoring system 12 and which are forwarded to telecommunications provider 60. In particular, the telecommunications provider 60 may decrypt header information of the wireless communications to obtain identification information of the wireless device 14. In one embodiment, the telecommunications provider 60 communicates the identification information (e.g., device ID, device configuration information) to the communications module 20 (FIG. 2) of the monitoring system 12.

In operation, according to one embodiment, an individual node device 16 may monitor for, and detect the presence of, one or more wireless devices 14 at one or more monitored areas 10. The node device 16 may obtain identification information regarding the wireless devices 14. In particular, the node device 16 may interrogate the detected wireless device 14 by generating a communication to the wireless device 14 requesting the identification information and the node device 16 may receive one or more responsive communications or replies therefrom. If the identity of wireless device 14 cannot be directly determined by the monitoring system 12 from the received wireless communications (e.g., header information of the wireless communications is encrypted), the monitoring system 12 may implement communications with telecommunications provider 60 to determine the content of the identification information of the wireless device 14. The identification information of the wireless device 14 may be communicated from the telecommunications provider 60 to the node device 16 and/or the management device 30. The node device 16 may communicate the reply from either the wireless device 14 or the telecommunications provider 60, depending on the embodiment, to management device 30. In some embodiments, the communication from node device 16 to management device 30 may be encrypted and communicated over a secure communication channel (e.g., using an internal network, intranet or Internet).

Storage media of management device 30 may include a stored database comprising identification information regarding authorized wireless devices 14. The processing circuitry 22 of the management device 30 may determine if the identification information received from a node device 16 indicates an appropriate wireless device 14 by comparing the obtained identification information with the stored identification information regarding one or more authorized wireless devices 14. If the identification information does not indicate an appropriate wireless device 14, the management device 30 may provide an alarm or other indication and/or communicate a reply to the respective node device 16 which may provide an alarm or other indication that the wireless device 14 is not authorized. In one embodiment, a node device 16 may also control a lock to preclude access to the monitored area 10 if a wireless device 14 is unauthorized.

If management device 30 does recognize the wireless device 14 as being authorized using the identification information, the management device 30 may extract authentication data (e.g., stored configuration information) for the respective wireless device 14. Processing circuitry 22 of the management device 30 may compare at least a portion or item of the stored authentication data with the device authentication data received from the wireless device 14. Management device 30 and/or the respective node device 16 may generate an alarm or other indication if the stored authentication data and device authentication data differ.

Otherwise, if the stored authentication data and device authentication data match, the management device 30 may communicate an authorized signal to the respective node device 16. The node device 16 may generate an indication that the wireless device 14 is authorized or do nothing and permit the presence of the wireless device 14 in the monitored area 10. Communications between the node devices 16 and the management device 30 may be authenticated or verified in some embodiments, and failure of authentication or verification may result in the identification of a wireless device 14 as unauthorized.

In another embodiment, an external device 40 may be present. As mentioned previously, the monitoring system 12 and external device 40 may correspond to different organizations in some embodiments. The external device 40 may be implemented as a corporate PED server in one possible implementation and the external device 40 may have been previously enrolled/approved as a participating member of the coverage network of monitoring system 12. One possible enrollment process may be established using secure keying and authentication data shared between the management device 30 and the external device 40.

As described above, an individual node device 16 may monitor for and detect the presence of wireless devices 14 at one or more monitored areas 10. The node device 16 may interrogate the detected wireless device 14 and receive replies from the wireless device 14. In some embodiments, the node device 16 may forward the replies to the telecommunications provider 60 for decoding. The node device 16 or the telecommunications provider 60 may communicate the reply to the management device 30. The communication from node device 16 to management device 30 and/or from the telecommunications provider 60 to the node device 16 or management device 30 may be encrypted in one embodiment. The management device 30 may use the corporate PED server identifier to route the communication to the respective external device 40 corresponding to the appropriate corporate PED server, and for example, using a respective wireless network 50 and wireless service provider 52 in one embodiment. In one embodiment, management device 30 may verify that the external device 40 is a subscribing member. If not, management device 30 and/or the respective node device 16 may generate an alarm or other appropriate indication that the wireless device 14 is unauthorized. The communications from node device 16 to management device 30 and to external device 40 may be encrypted and communicated over secure communication channels in one embodiment. For example, management device 30 may sign communications prior to communication thereof to external device 40. Management device 30 may also include an identifier of itself in the communication to external device 40 in one embodiment.

In one arrangement, the external device 40 may reside on a corporate internal network inside a firewall of the respective organization of the external device 40. In one embodiment, the communication to the external device 40 may be transmitted using the wireless network 50 and wireless service provider 52 associated with the respective wireless device 14 and the internet 54 to provide connection to the external device 40, for example, embodied as a corporate PED server.

Upon receipt, external device 40 may verify signatures of the wireless device 14, node device 16, and/or management device 30. Storage media 24 accessible by external device 40 may include a database comprising information regarding authorized wireless devices 14 associated with the organization of the CPS and seeking to gain entry into one of the monitored areas 10 of the organization associated with the monitoring system 12. The processing circuitry 22 of the external device 40 may determine if the identification information indicates an appropriate wireless device 14. In at least some embodiments, the processing circuitry 22 of the external device 40 may determine if the identification information indicates an appropriate wireless device by comparing the device identification information with stored information. If the identification information does not indicate an appropriate wireless device 14, the external device 40 may provide an alarm or other indication and/or communicate a reply to the management device 30 and respective node device 16, each of which may provide an alarm or other indication that the wireless device 14 is not authorized.

If external device 40 does recognize the wireless device 14 as being authorized, the external device 40 may extract stored authentication data (e.g., configuration information) for the respective device 14. Processing circuitry 22 of the external device 40 may compare the stored authentication data with the device authentication data received from the wireless device 14. The external device 40 may generate an alarm or other indication if the stored authentication data and device authentication data differ and/or communicate a reply to the monitoring system 12. Management device 30 and/or the respective node device 16 may also generate an alarm or other appropriate indication responsive to the reply from external device 40.

Otherwise, if the wireless device 14 is authorized (e.g., stored authentication data and device authentication data match) and all authentications are verified, the external device 40 may communicate an authorized signal to the management device 30 of the respective monitoring system 12. The management device 30 may verify or authenticate the authorized signal received from external device 40 and provide an authorized response to node device 16. In one embodiment, a secure data channel (e.g., encrypted data packets, digital signatures, public key infrastructure, etc.) intermediate devices 30 and 40 and/or devices 16 and 30 is used for communications and incoming packets are decrypted and their signatures checked to verify communications intermediate devices 30 and 40 and/or devices 16 and 20. Communications between devices 16 and 30 and devices 30 and 40 may be authenticated or verified in one embodiment and failure of authentication or verification may result in the identification of a wireless device 14 as unauthorized. In response to the authorizations from the devices 30 and 40, the management device 30 and/or node device 16 may generate an indication that the wireless device 14 is authorized or do nothing and permit the presence of the wireless device 14 in the monitored area 10.

According to an additional embodiment of a monitoring system 12, management device 30 or external device 40 may maintain a list of monitored areas 10 (e.g., of an organization) where a given wireless device 14 is authorized to be present. The communications to management device 30 and external device 40 may include an identifier of the respective node device 16 which detected the presence of the wireless device 14. Processing circuitry of device 30 and/or 40 may authenticate the identifier of node device 16 and/or compare the identifier of the node device 16 with the list of authorized monitored areas 10 for the respective wireless device 14 and may initiate an alarm or other indication as described herein if the wireless device 14 is unauthorized at the respective monitored area 10 in which it is present.

In another embodiment, external device 40 may initiate a communication apart from monitoring system 12 to the wireless device 14 (e.g., using the wireless network 50). The communication may request an identifier of the node device 16 and/or management device 30 which was communicated from the node device 16 to the wireless device 14 during the interrogation. The wireless device 14 communicates the identifier of the node device 16 and/or management device 30 to the external device 40 which may use the identifier to authenticate components of the monitoring system 12. An alarm or other indication may be generated by node device 16, management device 30 and/or external device 40 if the identifiers of the monitoring system 12 processed by the external device 40 do not match.

As discussed herein and according to some embodiments, the apparatus and methods of the disclosure may be used to verify that wireless devices 14 which are or are attempted to be brought into a monitored area are permitted to be present in that monitored area. The apparatus and methods may be used in one embodiment to verify that wireless devices 14 have not been altered, for example, to include malware or other system modifications. The apparatus and methods may be used in one embodiment to sound an alarm or other indication if non-approved or surreptitiously modified wireless devices 14 are present at a monitored area 10. According to various embodiments of the disclosure, information is provided whether the configuration of a wireless device 14 has been changed and/or whether the wireless device 14 is permitted access to one or more monitored areas 10. Approved wireless devices 14 may be brought into and operated within monitored areas 10 while providing information as to whether wireless devices 14 have been modified, perhaps maliciously, according to some embodiments of the disclosure.

As discussed above, monitoring system 12 may communicate with a wireless device 14 to implement one or more authentication functions in one embodiment (e.g., via interrogation and response signals in one embodiment). In some embodiments, monitoring system 12 may establish additional communications with the wireless device 14. By way of example and not limitation, the monitoring system 12 may use SMS or OTA messages of the telecommunications provider 60 to implement the additional communications. In one embodiment, the additional communications are independent of the wireless communications initially sent by the wireless device 14 and detected by the monitoring system 12 (e.g., independent of cellular network communications of the wireless device 14 and the telecommunications provider 60). For example, node device 16 of the monitoring system 12 may establish communications with the wireless device 14 via a Bluetooth connection or using near field communications in some embodiments. Other embodiments for implementing the additional communications are possible. The communications intermediate the monitoring system 12 and wireless device 14 may include the interrogation and response signals discussed above in one embodiment. Initial wireless communications from the wireless device 14 detected by the monitoring system 12 and other wireless communications intermediate the wireless device 14 and monitoring system 12 may be communicated using respective independent communications links in one embodiment.

Figure 7:
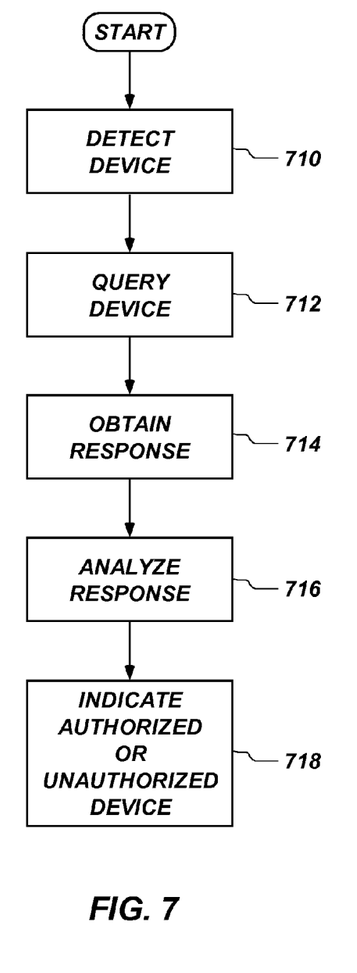
FIG. 7 is a flow diagram illustrating a method of identifying a wireless device as authorized or unauthorized according to one embodiment.

FIG. 7 is a flow diagram illustrating a method of identifying a wireless device as authorized or unauthorized according to one embodiment. Other methods are possible including more, less, and alternative acts. A wireless device brought into a monitored area is detected by a node device adjacent to the monitored area 710. The node device may query or interrogate the detected wireless device for information 712. The node device obtains a response from the wireless device including identification information 714. The response may include identification information comprising, for example, a unique device identifier, an indicator whether the device 14 is enrolled in a corporate serve and an identification of the corporate PED server (if appropriate), etc. In addition, the node device may obtain authentication data (e.g., device configuration information). The device may be identified as unauthorized if no response is received. The wireless device may be determined as authorized or unauthorized at the monitored area based on the obtained identification information and/or the obtained authentication data. For example, the device identification information and/or device authentication data are analyzed 716. The analysis may comprise comparing the device identification information and/or device authentication data with stored identification information and/or stored authentication data. A device may be identified as unauthorized if any of the device identification information or device authentication data fails to be verified or authenticated during the analysis. In response to the analysis, the wireless device may be identified as one of authorized and unauthorized and be permitted or precluded from entry into the monitored area 718.

Figure 8:
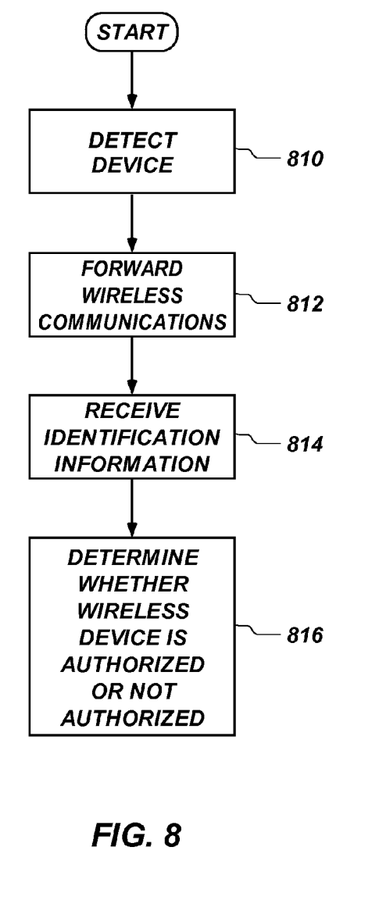
FIG. 8 is a flow diagram illustrating a method of identifying a wireless device as authorized or unauthorized according to one embodiment.

FIG. 8 is a flow diagram illustrating one embodiment of a method of identifying whether a wireless device which utilizes encrypted wireless communications is authorized to be present at a monitored location. Other methods are possible including more, less and/or different acts. The monitoring system detects the presence of a wireless device within a monitored area 810. For example, in one embodiment, the monitoring system receives wireless communications from the wireless device during communications of the wireless device with an associated wireless network (e.g., cellular network). The wireless device may be located within a monitored area by the monitoring system. In one example, the monitoring system is configured to monitor a doorway into a room and the monitoring system is configured to detect the wireless communications of a wireless device present within the doorway.

The monitoring system may receive identification information from the wireless device. The identification information may be received in response to an interrogation or a communication requesting the identification information. The monitoring system may determine that at least some content of the wireless communications is indecipherable to the monitoring system. For example, identification information of the wireless device cannot be ascertained from the wireless communications received by the monitoring system. The monitoring system operates to forward the wireless communications externally of the monitoring system to a provider of the wireless network used by the wireless device or a telecommunications provider in one embodiment 812.

The monitoring system receives identification information from the provider (or other source) which uniquely identifies the wireless device 814, and the monitoring system uses the identification information to determine whether the wireless device is authorized or unauthorized to be present at the location being monitored by the monitoring system 816. For example, the monitoring system may compare the received identification information with identification information stored within the monitoring system which identifies one or more devices authorized to be present at the monitored location. The monitoring system may implement interrogation operations with respect to the wireless device, as described above, and may indicate whether the wireless device is authorized responsive to the interrogation operations. The monitoring system may indicate the determined status of the authorization of the wireless device with respect to the location being monitored in one embodiment.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and legal equivalents, of the claims which follow.

What is claimed is:

1. A monitoring device, comprising:
    a communications module configured to detect the presence of a wireless device within a monitored area upon the wireless device being within wireless communications proximity to the monitoring device, transmit a first wireless communication to the wireless device in response to detecting the presence of the wireless device in the monitored area, the first wireless communication including an authentication identifier used by the wireless device to authenticate the monitoring device, receive a second wireless communication from the wireless device in response to the wireless device receiving the first wireless communication, the second wireless communication including an encrypted device identifier used by the monitoring device to authenticate the wireless device, forward the encrypted device identifier to at least one of a telecommunications provider and a management device, and receive the device identifier from the telecommunications provider in an unencrypted format;
    processing circuitry coupled with the communications module and configured to process the device identifier received from the at least one telecommunications provider and management device in an unencrypted format to determine whether the wireless device is authorized or unauthorized to be present at the monitored area; and
    an indication module configured to generate an indication regarding the presence of the wireless device when the wireless device is unauthorized to be present at the monitored area and provide the indication to a user of the monitoring device other than a user of the wireless device, the indication being at least one of a silent alarm, a visual alarm, and an audible alarm.

2. The monitoring device of claim 1, further comprising storage media configured to store information, and wherein the processing circuitry is configured to use the stored information to determine whether the wireless device is authorized or unauthorized to be present at the monitored area.

3. The monitoring device of claim 2, wherein the stored information comprises at least one of identification information and authentication data of one or more authorized wireless devices.

4. The monitoring device of claim 1, wherein the second wireless communication includes configuration data indicating a present configuration of the wireless device.

5. The monitoring device of claim 1, wherein the communications module is configured to communicate the wireless communications to at least one other monitoring device configured to determine whether the wireless device is authorized or unauthorized.

6. The monitoring device of claim 1, wherein the communications module is configured to receive the wireless communications from at least one other monitoring device.

7. The monitoring device of claim 1, wherein the communications module is configured to forward the wireless communications to an external device to determine whether the wireless device is authorized or unauthorized.

8. The monitoring device of claim 1, wherein the wireless device is associated with a user and the first wireless communication includes a request for identification information associated with the user and the second wireless communication includes the requested identification information associated with the user, further wherein the processing circuitry is configured to process the requested identification information to determine whether the user associated with the wireless device is authorized or unauthorized to be present at the monitored area.

9. A wireless device monitoring system, comprising:
    at least one monitoring device comprising:
        a communications module configured to detect the presence of wireless communications of a wireless device within a monitored area upon the wireless device being within wireless communications proximity to the at least one monitoring device, transmit a first wireless communication from the at least one monitoring device to the wireless device in response to detecting the presence of the wireless device in the monitored area, and receive a second wireless communication from the wireless device located within the monitored area in response to the wireless device receiving the first wireless communication, the second wireless communication including an encrypted device identifier used by the monitoring device to authenticate the wireless device, forward the encrypted device identifier to at least one of a telecommunications provider and a management device, and receive the device identifier from the telecommunications provider in an unencrypted format;
        processing circuitry coupled with the communications module and configured to process the device identifier received from the at least one telecommunications provider and management device in an unencrypted format to determine whether the wireless device is authorized or unauthorized to be present at the monitored area; and
        an indication module configured to generate an indication regarding the presence of the wireless device when the wireless device is unauthorized to be present at the monitored area and provide the indication to a user of the monitoring device other than a user of the wireless device, the indication being at least one of a silent alarm, a visual alarm, and an audible alarm.

10. The system of claim 9, wherein the communications module is configured to receive the wireless communications directly from the wireless device.

11. The system of claim 9, wherein the communications module is configured to receive the wireless communications of the wireless device from at least one other monitoring device.

12. The system of claim 11, wherein the at least one other monitoring device comprises at least another communications module configured to:
 detect the wireless communications of the wireless device;
 output communications to the wireless device and receive wireless communications from the wireless device responsive to the output communications; and
 communicate the wireless communications to the at least one monitoring device.

13. The system of claim 9, further comprising at least one storage medium configured to store information, and wherein the processing circuitry is configured to use the stored information to determine whether the wireless device is authorized or unauthorized to be present at the monitored area.

14. The system of claim 13, wherein the stored information comprises at least one of identification information and authentication data regarding at least one authorized wireless device.

15. The system of claim 9, wherein the wireless device is associated with a user and the first wireless communication includes a request for identification information associated with the user and the second wireless communication includes the requested identification information associated with the user, further wherein the processing circuitry is configured to process the requested identification information to determine whether the user associated with the wireless device is authorized or unauthorized to be present at the monitored area.

16. A method comprising:
 detecting, by a monitoring device, a wireless device within a monitored area upon the wireless device being within wireless communications proximity to the monitoring device;
 transmitting from the monitoring device a first wireless communication to the wireless device in response to detecting the presence of the wireless device in the monitored area, the first wireless communication including an authentication identifier used by the wireless device to authenticate the monitoring device;
 receiving, at the monitoring device, a second wireless communication from the wireless device in response to the wireless device receiving the first wireless communication, the second wireless communication including an encrypted device identifier;
 forwarding, by the monitoring device, the encrypted device identifier to at least one of a telecommunications provider and a management device;
 receiving, by the monitoring device, the device identifier in an unencrypted format from the at least one telecommunications provider and management device;
 determining, by the monitoring device, whether the wireless device is authorized or unauthorized to be present at the monitored area using the device identifier received from the at least one telecommunications provider and management device in an unencrypted format in response to the obtained identification information; and
 generating, by the monitoring device, an indication regarding the presence of the device when the wireless device is unauthorized to be present at the monitored area, the indication being at least one of a silent alarm, a visual alarm, and an audible alarm; and
 providing, by the monitoring device, the indication to a user of the monitoring device other than a user of the wireless device.

17. The method of claim 16, wherein detecting the wireless device comprises scanning frequencies of use of the wireless device.

18. The method of claim 16, further comprising determining that the wireless device is unauthorized upon failure of the wireless device to provide the at least one responsive communication.

19. The method of claim 16, wherein obtaining identification information regarding the wireless device comprises obtaining information regarding at least one of a unique device identifier, an indicator whether the wireless device is enrolled in a corporate personal electronic devices (PED) server, and an identification of the corporate PED server for the wireless device.

20. The method of claim 16, wherein obtaining identification information regarding the wireless device comprises:
 receiving, by the monitoring device, at least one indecipherable communication from the wireless device;
 forwarding, by the monitoring device, the at least one indecipherable communication to the at least one telecommunications provider and management device; and
 receiving, by the monitoring device, identification information regarding the wireless device from the at least one telecommunications provider and management device.

21. The method of claim 16, wherein determining whether the wireless device is authorized or unauthorized comprises comparing the obtained identification information from the wireless device with stored information.

22. The method of claim 16, wherein determining whether the wireless device is authorized or unauthorized comprises:
 communicating, by the monitoring device, with an external device in order to access information accessible by the external device; and
 comparing, by the monitoring device, the at least some of the identification information with information accessible by the external device.

23. The method of claim 16, further comprising:
 obtaining, by the monitoring device, device authentication data relating to the wireless device;
 accessing, by the monitoring device, a data storage device storing authentication data for the wireless device thereon;
 comparing, by the monitoring device, the obtained device authentication data with authentication data stored on the data storage device; and
 determining, by the monitoring device, if the wireless device is authorized or unauthorized responsive to the comparing.

24. The method of claim 16, wherein the wireless device is associated with a user and the first wireless communication includes a request for identification information associated with the user and the second wireless communication includes the requested identification information associated with the user, the method further comprising:
 processing, by the monitoring device, the requested identification information to determine whether the user associated with the wireless device is authorized or unauthorized to be present at the monitored area.

25. A method comprising:
 interrogating, by a monitoring device, a wireless device located in a monitored area;

receiving, by the monitoring device, at least one reply from the wireless device responsive to the interrogating the wireless device, wherein the at least one reply from the wireless device includes an encrypted device identifier;

forwarding, by the monitoring device, the encrypted device identifier to at least one of a telecommunications provider and a management device;

receiving, by the monitoring device, the device identifier in an unencrypted format from the at least one telecommunications provider and management device;

determining, by the monitoring device, whether the wireless device is authorized or unauthorized to be present at the monitored area using the device identifier received from the at least one telecommunications provider and management device in an unencrypted format, the determining being in compliance with the security protocol;

generating, by the monitoring device, an indication regarding the presence of the wireless device when the wireless device is unauthorized to be present at the monitored area, the indication being at least one of a silent alarm, a visual alarm, and an audible alarm; and providing, by the monitoring device, the indication to a user of the monitoring device other than a user of the wireless device.

26. The method of claim 25, wherein interrogating a wireless device comprises requesting at least one of identification information of the wireless device and authentication data of the wireless device.

27. The method of claim 25, wherein receiving at least one reply from the wireless device responsive to the interrogating the wireless device comprises receiving at least one indecipherable reply from the wireless device, and further comprising:

forwarding, by the monitoring device, the at least one indecipherable reply to the at least one telecommunications provider and management device; and receiving, by the monitoring device, the at least one reply in a decipherable format from the at least one telecommunications provider and management device.

28. The method of claim 25, wherein determining whether the wireless device is authorized or unauthorized to be present at the monitored area comprises comparing the at least one received reply with information stored on a data storage device communicatively coupled to the monitoring device.

29. The method of claim 25, wherein determining whether the wireless device is authorized or unauthorized comprises:

communicating, by the monitoring device, with an external device in order to access information accessible by the external device; and comparing, by the monitoring device, the at least a portion of the at least one received reply from the wireless device with information accessible by the external device.

30. The method of claim 25, wherein the wireless device is associated with a user and the interrogation includes a request for identification information associated with the user and the at least one reply includes the requested identification information associated with the user, the method further comprising:

processing, by the monitoring device, the requested identification information to determine whether the user associated with the wireless device is authorized or unauthorized to be present at the monitored area.

* * * * *